United States Patent
Sekiya et al.

(10) Patent No.: US 10,242,762 B2
(45) Date of Patent: Mar. 26, 2019

(54) COPPER ALLOY WIRE ROD AND METHOD FOR MANUFACTURING COPPER ALLOY WIRE ROD

(71) Applicant: FURUKAWA ELECTRIC CO., LTD., Tokyo (JP)

(72) Inventors: Shigeki Sekiya, Tokyo (JP); Kengo Mitose, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/032,431

(22) Filed: Jul. 11, 2018

(65) Prior Publication Data

US 2018/0322979 A1 Nov. 8, 2018

Related U.S. Application Data

(63) Continuation of application No. PCT/JP2017/037975, filed on Oct. 20, 2017.

(30) Foreign Application Priority Data

Dec. 2, 2016 (JP) .................................. 2016-234811

(51) Int. Cl.
*C22C 9/00* (2006.01)
*H01B 1/02* (2006.01)
(Continued)

(52) U.S. Cl.
CPC ........... *H01B 1/026* (2013.01); *B22D 11/004* (2013.01); *B22D 11/005* (2013.01);
(Continued)

(58) Field of Classification Search
CPC .... H01B 1/026; B22D 11/004; B22D 11/005; B23K 35/40; B23K 35/302; C22C 5/08; C22C 9/00
See application file for complete search history.

(56) References Cited

U.S. PATENT DOCUMENTS 3,922,180 A * 11/1975 Fuchs ................... C22C 1/1078
148/430
5,534,087 A * 7/1996 Hirota ....................... C22C 9/00
148/554
(Continued)

FOREIGN PATENT DOCUMENTS

JP H06-192802 A 7/1994
JP H11-293365 A 10/1999
(Continued)

OTHER PUBLICATIONS

International Search Report dated Jan. 30, 2018, issued in corresponding Japanese Patent Application No. PCT/JP2017/037975.

*Primary Examiner* — Timothy J Thompson
*Assistant Examiner* — Rhadames Alonzo Miller
(74) *Attorney, Agent, or Firm* — Morgan, Lewis & Bockius LLP

(57) ABSTRACT

A copper alloy wire rod containing Ag: 0.5 wt % or more and 6 wt % or less and the balance including inevitable impurities and Cu, in which, on a cross section parallel to a longitudinal direction of the copper alloy wire rod, within a range observed with a visual field of 1.7 μm in a direction perpendicular to the longitudinal direction and 2.3 μm in a direction parallel to the longitudinal direction, the copper alloy wire rod has at least one rectangular range that is a rectangular range having a width perpendicular to the longitudinal direction of 0.2 μm and a length parallel to the longitudinal direction of 2.3 μm and entirely includes five or more second phase particles containing Ag and having a maximum length in the longitudinal direction of less than 300 nm.

12 Claims, 5 Drawing Sheets

(51) Int. Cl.
*B22D 11/00* (2006.01)
*B23K 35/30* (2006.01)
*B23K 35/40* (2006.01)
*H01B 13/00* (2006.01)

(52) U.S. Cl.
CPC ........ *H01B 13/0016* (2013.01); *B23K 35/302* (2013.01); *B23K 35/40* (2013.01); *C22C 9/00* (2013.01)

(56) References Cited

U.S. PATENT DOCUMENTS

| | | | | |
|---|---|---|---|---|
| 2003/0108664 | A1* | 6/2003 | Kodas | C09D 11/30 |
| | | | | 427/125 |
| 2005/0260438 | A1* | 11/2005 | Aoyagi | C22C 9/00 |
| | | | | 428/673 |
| 2011/0017357 | A1* | 1/2011 | Sato | C22C 9/06 |
| | | | | 148/412 |
| 2011/0073221 | A1* | 3/2011 | Kaneko | C22C 9/06 |
| | | | | 148/554 |
| 2011/0097238 | A1* | 4/2011 | Oishi | B22D 11/004 |
| | | | | 420/587 |
| 2011/0192505 | A1* | 8/2011 | Kaneko | C22C 9/06 |
| | | | | 148/554 |
| 2013/0333812 | A1* | 12/2013 | Ishida | H01B 1/026 |
| | | | | 148/554 |
| 2014/0010704 | A1* | 1/2014 | Ishida | C22F 1/08 |
| | | | | 420/471 |
| 2014/0190596 | A1* | 7/2014 | Inoue | C22F 1/08 |
| | | | | 148/554 |
| 2018/0274074 | A1* | 9/2018 | Ito | C22C 9/00 |

FOREIGN PATENT DOCUMENTS

| | | |
|---|---|---|
| JP | 2009-280860 A | 12/2009 |
| JP | 2011-246802 A | 12/2011 |
| JP | 5713230 B2 | 5/2015 |
| JP | 2017-002337 A | 1/2017 |
| WO | 2015/152166 A1 | 10/2015 |
| WO | 2017-199906 A1 | 11/2017 |

* cited by examiner

COPPER ALLOY WIRE ROD AND METHOD FOR MANUFACTURING COPPER ALLOY WIRE ROD

TECHNICAL FIELD

The present invention relates to a copper alloy wire rod and a method for manufacturing a copper alloy wire rod.

BACKGROUND ART

A coil on which an insulation-covered wire rod is wound many times is used for a micro speaker or the like, and a sound is emitted when the coil vibrates by a current. An end part of the wire rod forming the coil is fixed to a terminal of the speaker by caulking or soldering. A coil part itself is fixed by a fusing agent, but the wire rod between the end part and the coil part vibrates due to the vibration of the coil. There is a problem of disconnection of the wire rod if the wire rod has low vibration durability at the time, and thus, high vibration durability is necessary for the wire rod.

In addition, due to the current downsizing of electronic devices, micro speakers are also downsized, and thinning of wire rods is advanced. When a wire rod is thinned, heat is generated due to an increase in electric resistance when a current is made flow and vibration of a coil on which the wire rod is wound. Therefore, heat resistance capable of securing high vibration durability even under a high-temperature environment is also required for the wire rod.

Furthermore, in recent years, a requirement for high-quality sound typified by high-resolution audio is increased. In order to obtain a micro speaker that can also react to such high-frequency vibration, a wire rod having high-cycle vibration durability and heat resistance is required.

Conventionally, a copper alloy wire containing silver has been sometimes used for a wire rod used for a coil. This is because the copper alloy wire containing silver has a property in which strength is improved due to appearance of silver added into copper as crystallized precipitates, and a property in which a decrease in electric conductivity is small even when silver is added into copper while electric conductivity is generally decreased when an additive element is solid dissolved in copper. Before now, as a copper alloy wire which excels in vibration durability, for example, a Cu—Ag alloy wire in which an area ratio of crystallized precipitates having a maximum length of a straight line that cuts the crystallized precipitates of 100 nm or less is 100% is known (PTL 1).

CITATION LIST

Patent Literature

PTL 1: JP 5713230 B2

SUMMARY OF INVENTION

Technical Problem

However, in the technology disclosed in PTL 1, the distribution state of the crystallized precipitates is not described, and it is difficult to obtain sufficient vibration durability and heat resistance, and thus, further improvement in vibration durability and heat resistance is required.

The present invention was made in view of the above-described problem, and it is an object of the present invention to provide a copper alloy wire rod which excels in vibration durability and heat resistance, and a method for manufacturing a copper alloy wire rod.

Solution to Problem

According to one mode of the present invention, a copper alloy wire rod containing Ag: 0.5 wt % or more and 6 wt % or less and the balance including inevitable impurities and Cu, in which, on a cross section parallel to a longitudinal direction of the copper alloy wire rod, within a range observed with a visual field of 1.7 μm in a direction perpendicular to the longitudinal direction and 2.3 μm in a direction parallel to the longitudinal direction, the copper alloy wire rod has at least one rectangular range that is a rectangular range having a width perpendicular to the longitudinal direction of 0.2 μm and a length parallel to the longitudinal direction of 2.3 μm and entirely includes five or more second phase particles containing Ag and having a maximum length in the longitudinal direction of less than 300 nm, is provided.

According to one mode of the present invention, a method for manufacturing a copper alloy wire rod including: a casting step of manufacturing an ingot of copper alloy by casting molten metal containing Ag: 0.5 wt % or more and 6 wt % or less and the balance including inevitable impurities and Cu at a cooling rate of 500° C./s or more; a wire drawing step of manufacturing a copper alloy wire rod by wire-drawing processing the ingot; and a heat treating step of heat treating the copper alloy wire rod at a heat treatment temperature of 300° C. or more and 370° C. or less and retention time of 10 seconds or less is provided.

Advantageous Effects of Invention

According to one mode of the present invention, a copper alloy wire rod which excels in vibration durability and heat resistance, and a method for manufacturing a copper alloy wire rod are provided.

DESCRIPTION OF EMBODIMENTS

Figure 1:
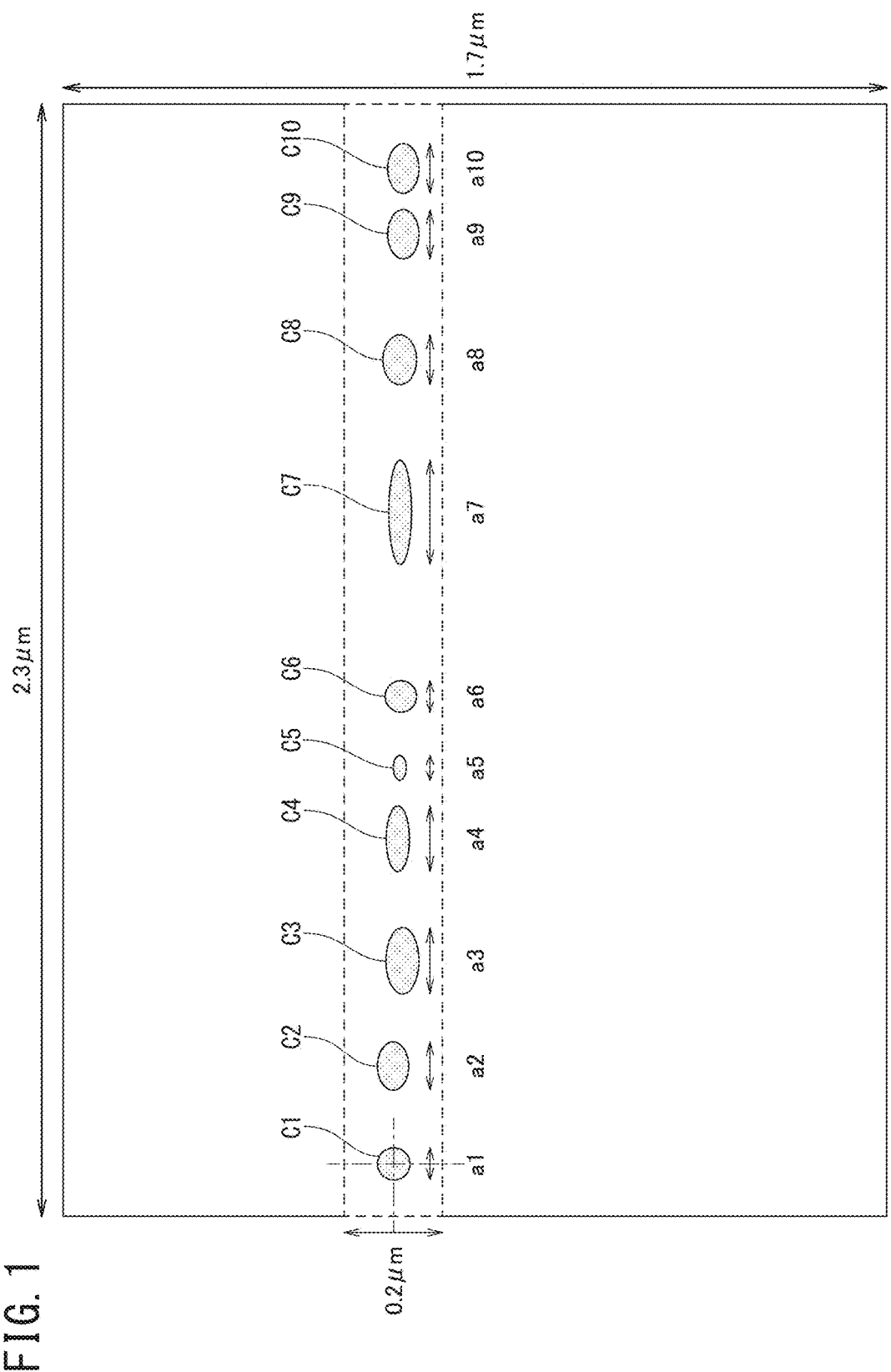
FIG. 1 is a schematic diagram of a cross section parallel to a longitudinal direction of a copper alloy wire rod according to one embodiment of the present invention.

In the following detailed description, a number of specific details will be described for providing complete understanding of embodiments of the present invention. However, it is clear that one or more embodiments are practicable without such specific details. In addition, well-known structures and devices are illustrated by diagrams for simplifying the drawings.

<Copper Alloy Wire Rod>

A copper alloy wire rod according to one embodiment of the present invention will be described. The copper alloy wire rod according to the present embodiment is a wire rod used for a coil of a micro speaker or the like. Preferably, a wire diameter d [mm] that is the diameter of the copper alloy wire rod is 0.01 mm or more and 0.32 mm or less.

The copper alloy wire rod contains Ag: 0.5 wt % or more and 6 wt % or less, and the balance includes inevitable impurities and Cu. Since Ag exists in a solid-solution state in mother phase copper or a second phase state containing Ag, solid solution strengthening or dispersion strengthening is exerted. The second phase is a crystal having a crystal structure different from the copper mother phase, and is composed of a compound or a single phase containing Ag. When the content of Ag is less than 0.5 wt %, the effect of the solid solution strengthening or the dispersion strengthening cannot be sufficiently obtained, and tensile strength and vibration durability are decreased. In contrast, when the content of Ag is more than 6.0 wt %, electric conductivity is decreased. In addition, when the content of Ag is more than 6.0 wt %, a raw material cost is also increased. Although, in copper alloy, the improvement in tensile strength and the improvement in electric conductivity generally contradict each other, desired characteristics can be obtained by adjusting, for desired strength and electric conductivity, the Ag content within the range of 0.5 wt % or more and 6.0 wt % or less.

Moreover, in addition to the above-described component composition structure, the copper alloy wire rod may further contain one or two or more elements selected from the group consisting of Mg: more than 0 wt % and 1 wt % or less, Cr: more than 0 wt % and 1 wt % or less, and Zr: more than 0 wt % and 1 wt % or less. Since Mg, Cr, and Zr exist mainly in the solid-solution state in the mother phase copper or the second phase state together with Ag, the solid solution strengthening or the dispersion strengthening is exerted as is the case with Ag. Mg, Cr, and Zr exist as a ternary or more second phase, such as Cu—Ag—Zr, by being contained together with Ag, and contribute to the dispersion strengthening. Mg, Cr, and Zr sufficiently provide performance as the dispersion strengthening when the contents in the copper alloy wire rod are high. However, when each of the contents of Mg, Cr, and Zr is more than 1 wt %, the electric conductivity is lowered too much. Therefore, desirably, the upper limit of each of the contents of Mg, Cr, and Zr is 1 wt %. Furthermore, desirably, the upper limit of each of the contents of Mg, Cr, and Zr is 0.5 wt %.

Furthermore, the copper alloy wire rod contains second phase particles containing Ag on a cross section parallel to a longitudinal direction. The second phase particles are linearly arranged along the longitudinal direction of the copper alloy wire rod. In addition, on the cross section parallel to the longitudinal direction, within a range observed with a visual field of 1.7 μm in a direction perpendicular to the longitudinal direction and 2.3 μm in a direction parallel to the longitudinal direction, the copper alloy wire rod has at least one rectangular range entirely including five or more second phase particles having a maximum length in the longitudinal direction of the copper alloy wire rod of less than 300 nm. The rectangular range is a range having a width perpendicular to the longitudinal direction of 0.2 μm and a length parallel to the longitudinal direction of 2.3 μm.

FIG. 1 illustrates a schematic diagram of the cross section parallel to the longitudinal direction of the copper alloy wire rod. A rectangular frame border indicated by the solid line of FIG. 1 indicates a rectangular range having a length of 2.3 μm in the longitudinal direction (horizontal direction in FIG. 1) and a length of 1.7 μm in the direction perpendicular to the longitudinal direction (vertical direction in FIG. 1), on the cross section parallel to the longitudinal direction of the copper alloy wire rod. In FIG. 1, an outlined region in the rectangular frame border indicates a copper mother phase. In addition, in FIG. 1, hatched multiple circular regions indicate second phase particles C1 to C10. Furthermore, in FIG. 1, a rectangular range indicated by the dashed line is the above-described rectangular range. The rectangular range has a width perpendicular to the longitudinal direction of the copper alloy wire rod of 0.2 μm and a length parallel to the longitudinal direction of 2.3 μm, and entirely includes five or more second phase particles having a maximum length in the longitudinal direction of the copper alloy wire rod of less than 300 nm. Furthermore, from the viewpoint of more improving the vibration durability, preferably, 10 or more second phase particles having a maximum length in the longitudinal direction of the copper alloy wire rod of less than 300 nm are entirely included in the rectangular range. Consequently, the vibration durability at 20° C. can be 20 million times or more. It is to be noted that, although the upper limit of the number of the second phase particles having a maximum length in the longitudinal direction of the copper alloy wire rod of less than 300 nm, which are included in the rectangular range, is not limited, when the number is too many, separation occurs at the interface between the second phase particles and the mother phase, and the probability of disconnection is increased. In addition, when the number is too many, stiffness is increased, and a wire shape becomes strong, and thus, it is thought that handling at the time of manufacture becomes difficult. Therefore, desirably, the number is 33 or less.

Figure 2:
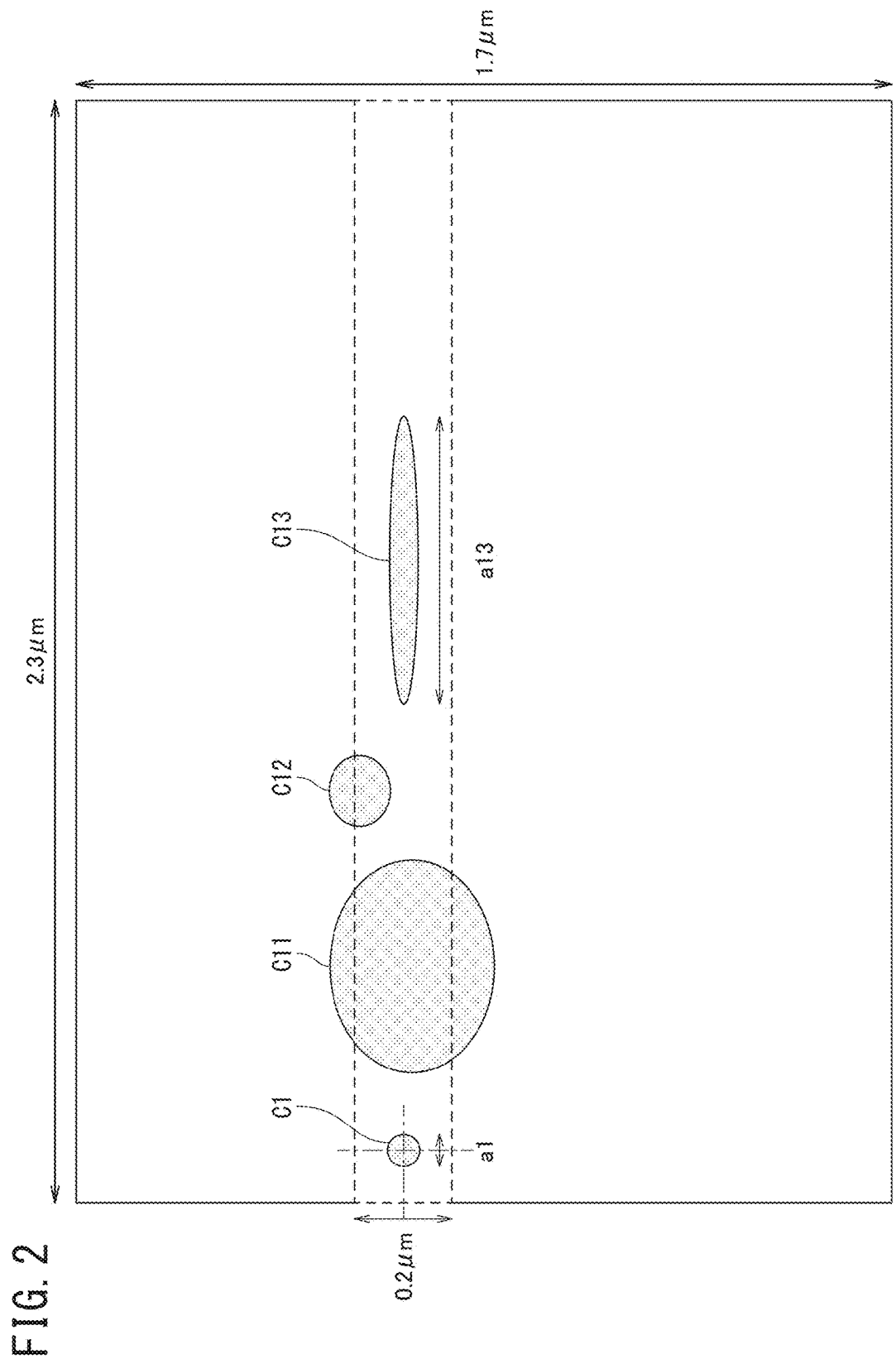
FIG. 2 is a schematic diagram illustrating second phase particles included in a rectangular range.

Here, entirely including the second phase particles means that, in the rectangular range on the cross section of the copper alloy wire rod, the second phase particles exist only in the rectangular range. Therefore, as illustrated in a schematic diagram of the cross section of FIG. 2, a second phase particle C11 which has a maximum length in the direction perpendicular to the longitudinal direction of the copper alloy wire rod of more than 0.2 μm and extends beyond the rectangular range, and a second phase particle C12, a part of which is arranged in a range beyond the rectangular range, are not included in the second phase particles entirely included in the rectangular range. In addition, as described above, even a second phase particle that exists only in the rectangular range, one having a length in the longitudinal direction of the copper alloy wire rod of 300 nm or more, such as a second phase particle C13 of FIG. 2, is not counted as the five or more second phase particles entirely included in the rectangular range. A second phase particle having a length in the longitudinal direction of the copper alloy wire rod of 300 nm or more is too large, and thus, possibly concentrates strain without dispersion when the copper alloy wire rod vibrates, and possibly does not contribute to the improvement in vibration durability.

When the rectangular range is determined from a structure photograph, whether five or more second phase particles are entirely included in the rectangular range may be determined by, for example, applying a dotted line rectangular range to a row in which five or more second phase particles line in the longitudinal direction of the copper alloy wire rod at a glance. In this case, as illustrated in FIG. 1, the rectangular range may be set with the leftmost second phase particle of the structure photograph as the center of a width direction (vertical direction in FIG. 1). In addition, multiple second phase particles sometimes exist in the direction perpendicular to the longitudinal direction of the copper alloy wire rod. Therefore, when the rectangular range is determined, whether five or more second phase particles are entirely included in the rectangular range may be determined by applying a rectangular range to second phase particles located in a left-hand predetermined region of the structure photograph (for example, a one-fifth region with respect to a length in the horizontal direction of the structure photograph) such that each of the second phase particles becomes the center of the width direction.

Furthermore, preferably, in the rectangular range, the sum of the maximum lengths in the longitudinal direction of the five or more second phase particles entirely included in the rectangular range is 300 nm or more. For example, in the example illustrated in FIG. 1, 10 second phase particles C1 to C10 are included in the dashed line rectangular range. The maximum lengths in the longitudinal direction of the second phase particles C1 to C10 are lengths a1 to a10, respectively. In other words, preferably, in the example illustrated in FIG. 1, a length obtained by summing up the lengths a1 to a10 is 300 nm or more. The length obtained by summing up the lengths a1 to a10 is 300 nm or more, so that the effect of the dispersion strengthening can be sufficiently obtained, and the vibration durability is improved. Furthermore, from the viewpoint of more improving the vibration durability, preferably, the sum of the maximum lengths in the longitudinal direction of the five or more second phase particles included in the rectangular range is 340 nm or more. Consequently, the vibration durability at 20° C. can be 20 million times or more. It is to be noted that, although the upper limit of the total length of the maximum lengths in the longitudinal direction of the five or more second phase particles included in the rectangular range is not limited, when the total length is too long, separation occurs at the interface between the second phase particles and the mother phase, and the probability of disconnection is increased. Therefore, desirably, the maximum lengths are 1230 nm or less.

Generally, in cyclic fatigue with a small load, such as vibration of a micro speaker, the performance tends to be able to be maintained during high cycles. However, even when the load is so small, microscopic strain is generated during the cyclic fatigue. Accumulation of the strain sometimes leads to fracture. Here, the strain state of the material means that the crystal structure is disturbed by a defect, misalignment of atoms, and the like. In the cyclic fatigue of the copper alloy wire rod, microscopic strain is increased by the cyclic fatigue at first, eventually becomes large strain, and becomes a structure in which atomic arrangement is considerably disturbed or a void. Furthermore, when stress is concentrated on the defective part, the defect is enlarged, and eventually leads to breakage. In this case, when multiple Ag second phase particles exist in the material, the strain is blocked by the second phase particles, and thus, the strain becomes difficult to be accumulated, and the defect becomes difficult to be enlarged. Furthermore, when the second phase particles are continuously arranged in the direction parallel to the longitudinal direction of the copper alloy wire rod, the strain becomes easy to be blocked by the second phase particles due to the regularity, and thus, the defect becomes difficult to be enlarged. In other words, according to the copper alloy wire rod in which the second phase particles are linearly arranged along the longitudinal direction, the performance can be maintained during higher cycles. Furthermore, the arrangement is not disturbed even when being under a high-temperature environment (for example, 80° C.), and thus, the performance can be maintained during high cycles.

It is to be noted that, from the viewpoint of blocking the strain, it is better that the maximum length of a second phase particle in the longitudinal direction of the copper alloy wire rod is as small as possible, and furthermore, preferably, the second phase particles are continuously arranged in the longitudinal direction. In addition, for the similar reason, preferably, rows of the second phase particles that are continuous in the longitudinal direction are formed in the copper alloy wire rod as many as possible.

Furthermore, preferably, the copper alloy wire rod has the number of times of vibration durability in a vibration test conducted under a test environment of 80° C. of 10 million times or more.

<Method for Manufacturing Copper Alloy Wire Rod>

Next, a method for manufacturing a copper alloy wire rod according to the present embodiment will be described. In the method for manufacturing a copper alloy wire rod, a copper alloy wire rod is manufactured by sequentially performing a casting step, a wire drawing step, and a heat treating step.

First, an ingot of copper alloy is manufactured by casting molten metal to be the above-described component composition of the copper alloy wire rod (casting step). In the casting step, raw materials, such as copper (oxygen-free copper) and Ag, are melted in advance to have the above-described component composition of the copper alloy wire rod. In this case, preferably, in order to avoid incorporation of oxygen into the molten metal, the melting of the raw materials is performed in an oxygen-free gas atmosphere, such as a nitrogen atmosphere. Then, the molten metal in which the raw materials are melted is injected into a water-cooled mold capable of adjusting a cooling rate and is solidified, so that the ingot of copper alloy having a predetermined section size is continuously casted.

An average cooling rate from 1085° C. to 780° C. when casting the ingot is 500° C./s or more. By setting the average cooling rate from 1085° C. to 780° C. to 500° C./s or more, a temperature gradient during the solidification becomes large, finer columnar crystals appear, and crystallized products can be uniformly dispersed. When the average cooling rate is less than 500° C./s, cooling unevenness occurs, crystallized products become easy to be non-uniform, the arrangement of the second phase particles that are continuous in the direction parallel to the longitudinal direction after the subsequent heat treating step also becomes non-uniform, and the high vibration durability possibly cannot be satisfied. It is to be noted that, when the average cooling rate is more than 1000° C./s, filling of the molten metal cannot be kept up because the cooling is too fast, a material including voids in an ingot wire rod is obtained, and the probability of disconnection during the wire drawing is increased. Therefore, preferably, the average cooling rate from 1085° C. to 780° C. is 1000° C./s or less.

The above-described cooling rate during the casting can be measured by setting an about φ10 mm wire in which an R-type thermocouple is embedded in the mold at the start of the casting and recording a temperature change when drawing it. The R-type thermocouple is embedded so as to be located at the center of the wire. In addition, the drawing is started from a state where the tip of the R-type thermocouple is straight immersed in the molten metal.

Next, a wire rod having a predetermined section size is manufactured by wire-drawing processing the ingot of copper alloy manufactured in the casting step (wire drawing step). In the wire drawing step, the wire rod is processed to have a final product dimension having a wire diameter d of 0.01 mm or more and 0.32 mm or less. The wire drawing has an effect of elongating crystallized precipitates in a wire drawing direction, and fibrous crystallized precipitates can be obtained. In order to generate the fibrous crystallized precipitates without bias in the wire rod, the design of a pass schedule is necessary for uniformly elongating inside and outside the wire. Preferably, in a one-pass dies, a processing rate (cross-section decrease rate) is 10% or more and 30% or less. When the processing rate is less than 10%, application of shear stress of the dies is concentrated on the surface of the wire rod, and thus, the surface of the wire rod is preferentially elongated and is wire-drawn. When being wire-drawn in this manner, a phenomenon in which a large number of the fibrous crystallized precipitates are distributed on the surface of the wire rod and a relatively small number of the crystallized precipitates are distributed in the vicinity of the center of the wire rod is caused. Therefore, the arrangement of the second phase particles that are continuous in the direction parallel to the longitudinal direction after the heat treating step is also biased, and thus, the vibration durability cannot be sufficiently obtained. In addition, when the processing rate is more than 30%, pull-out force needs to be increased, and the probability of disconnection is increased. In consideration of a recent demand for narrowing diameters, preferably, the final wire diameter of the copper alloy wire rod according to the present invention is 0.15 mm or less. It is to be noted that, for the wire diameter of less than 0.1 mm, the ratio of the cross section to the surface area of the wire rod becomes large, and thus, the influence on the distribution of the second phase particles after the final heat treatment in the present invention is slight. Therefore, the one-pass processing rate for the wire diameter of less than 0.1 mm is not limited to the above-described range of 10% or more and 30% or less. Instead, tensile force capable of withstanding during the wire drawing is decreased when the wire diameter is narrowed, and thus, for the wire diameter of less than 0.1 mm, the wire drawing is sometimes performed at a processing rate of less than 10%. Here, crystals containing a large amount of Ag, which appear during the cooling to 780° C. in the casting step, are called crystallized products, crystals containing a large amount of Ag, which appear during the cooling at less than 780° C., are called precipitates, and they are collectively called crystallized precipitates.

Furthermore, the copper alloy wire rod is manufactured by performing heat treatment for the wire rod manufactured in the wire drawing step (heat treating step). In the heat treating step, the wire rod is heat-treated at a heat treatment temperature of 300° C. or more and 370° C. or less and retention time of 10 seconds or less. By setting the heat treatment temperature to 300° C. or more and 370° C. or less and the retention time to 10 seconds or less, the fibrous crystallized precipitates formed in the wire drawing step are divided into multiple second phases and are continuously arranged in the longitudinal direction of the wire rod, and thus, the vibration durability can be improved. In contrast, when the heat treatment temperature is less than 300° C., the fibrous crystallized precipitates formed in the wire drawing step are not divided into multiple second phases. In addition, when the heat treatment temperature is more than 370° C., the ratio of large second phase particles is increased. Therefore, in any case, the rectangular range entirely including five or more second phase particles having a maximum length in the longitudinal direction of less than 300 nm does not exist in the range of 1.7 μm×2.3 μm on the cross section parallel to the longitudinal direction of the copper alloy wire rod, and the vibration durability is bad. Furthermore, when the retention time is more than 10 seconds, the ratio of large second phase particles is also increased. Therefore, the rectangular range entirely including five or more second phase particles having a maximum length in the longitudinal direction of less than 300 nm does not exist in the range of 1.7 μm×2.3 μm on the cross section parallel to the longitudinal direction of the copper alloy wire rod, and the vibration durability is bad.

In the present embodiment, by setting the cooling rate in the casting step to 500° C./s or more, setting the processing rate in the wire drawing step to 10% or more and 30% or less, and setting the heat treatment temperature in the heat treating step to 300° C. or more and 370° C. or less and the retention time to 10 seconds or less, five or more second phase particles containing Ag can be linearly arranged in the rectangular range by a combination of them.

Modified Examples

Although the present invention has been described above with reference to the specific embodiment, it is not intended to limit the invention by the description. By referring to the description of the present invention, various modified examples of the disclosed embodiment and other embodiments of the present invention are apparent to those skilled in the art. Therefore, it should be understood that claims cover these modified examples or embodiments included in the scope and sprit of the present invention.

Although at least one rectangular range is required to exist in the range of 1.7 μm×2.3 μm on the cross section parallel to the longitudinal direction of the copper alloy wire rod in the above-described embodiment, the present invention is not limited to the example. Since the vibration durability becomes higher as the number of the rectangular ranges existing per area is increased, the number of the rectangular ranges existing in the range of 1.7 μm×2.3 μm may be two or more, for example. It is to be noted that the number of the rectangular ranges existing in the range of 1.7 μm×2.3 μm can be appropriately selected depending on desired vibration durability.

Effects of Embodiment (1) A copper alloy wire rod according to one mode of the present invention is a copper alloy wire rod containing Ag: 0.5 wt % or more and 6 wt % or less and the balance including inevitable impurities and Cu, in which, on a cross section parallel to a longitudinal direction of the copper alloy wire rod, within a range observed with a visual field of 1.7 μm in a direction perpendicular to the longitudinal direction and 2.3 μm in a direction parallel to the longitudinal direction, the copper alloy wire rod has at least one rectangular range that is a rectangular range having a width perpendicular to the longitudinal direction of 0.2 μm and a length parallel to the longitudinal direction of 2.3 μm and entirely includes five or more second phase particles containing Ag and having a maximum length in the longitudinal direction of less than 300 nm.

According to the configuration of the above (1), by containing Ag, the tensile strength and the vibration durability of the copper alloy wire rod can be improved by the solid solution strengthening and the dispersion strengthening. In addition, since the second phase particles arranged along the longitudinal direction are included, the concentration of the strain generated in the cyclic fatigue with a small load, such as vibration, is suppressed, and the vibration durability is further improved. Furthermore, high vibration durability can be secured even under a high-temperature environment, and thus, heat resistance is also excellent.

(2) In the configuration of the above (1), the sum of the maximum lengths in the longitudinal direction of the five or more second phase particles entirely included in the rectangular range is 300 nm or more.

According to the configuration of the above (2), the strain becomes easy to be blocked by the second phase particles when the total length of the second phase particles is increased, and thus, the defect becomes difficult to be enlarged, and the vibration durability can be more improved.

(3) In the configuration of the above (1) or (2), one or two or more elements selected from the group consisting of Mg: more than 0 wt and 1 wt % or less, Cr: more than 0 wt and 1 wt % or less, and Zr: more than 0 wt and 1 wt % or less are further contained.

According to the configuration of the above (3), the vibration durability can be more improved by the dispersion strengthening due to the ternary or more second phase to be formed.

(4) In any of the configurations of the above (1) to (3), the number of times of vibration durability in a vibration test conducted under a test environment of 80° C. is 10 million times or more.

According to the configuration of the above (4), sufficient vibration durability is obtained as a coil used for a micro speaker.

(5) In any of the configurations of the above (1) to (4), a wire diameter is 0.01 mm or more and 0.32 mm or less.

According to the configuration of the above (5), application to a small coil used for a small micro speaker or the like is possible, and a contribution to downsizing of products is obtained.

(6) A method for manufacturing a copper alloy wire rod according to one mode of the present invention includes: a casting step of manufacturing an ingot of copper alloy by casting molten metal containing Ag: 0.5 wt % or more and 6 wt % or less and the balance including inevitable impurities and Cu at a cooling rate of 500° C./s or more; a wire drawing step of manufacturing a wire rod by wire-drawing processing the ingot; and a heat treating step of heat treating the wire rod at a heat treatment temperature of 300° C. or more and 370° C. or less and retention time of 10 seconds or less.

According to the configuration of the above (6), the copper alloy wire rod having the configuration of the above (1), which excels in vibration durability and heat resistance, can be manufactured.

EXAMPLES

Next, examples conducted by the present inventor will be described. In the examples, the copper alloy wire rod according to the above-described embodiment was manufactured by changing a component composition or a manufacturing condition, and structure and characteristic evaluation was conducted. It is to be noted that, in the examples, the manufacturing condition changed depending on conditions is the cooling rate in the casting step, and the heat treatment temperature and the retention time in the heat treating step. In addition, as comparative examples, the copper alloy wire having a component composition or a manufacturing condition different from the above-described embodiment was manufactured, and the structure and characteristic evaluation was conducted in the same manner as the examples.

Table 1 indicates the component composition, the manufacturing condition, and results of the structure and characteristic evaluation described below in the examples.

TABLE 1

| No. | Component Composition Ag wt% | Mg wt% | Cr wt% | Zr wt% | Cu and Inevitable Impurities | Manufacturing Condition - Casting Step Cooling Rate °C/s | Wire Drawing Step Final Wire Diameter mm | Heat Treating Step Heat Treatment Temperature °C | Retention Time s | Structure Evaluation - Presence or Absence of Rectangular Range Including Five or More Second Phase Particles | Average Number of Second Phase Particles in Rectangular Range Number | Total Length of Second Phase Particles in Rectangular Range nm | Characteristic Evaluation - Durability at 20°C, Number of Times of Vibration Ten Thousand Times | Durability at 80°C, Number of Times of Vibration Ten Thousand Times | Electric Conductivity % IACS |
|---|---|---|---|---|---|---|---|---|---|---|---|---|---|---|---|
| Example 1 | 0.5 | — | — | — | Balance | 700 | 0.1 | 300 | 10 | Presence | 5 | 140 | 1030 | 520 | 95 |
| Example 2 | 1.0 | — | — | — | Balance | 700 | 0.1 | 300 | 10 | Presence | 6 | 180 | 1250 | 600 | 94 |
| Example 3 | 2.0 | — | — | — | Balance | 700 | 0.1 | 300 | 10 | Presence | 8 | 300 | 1600 | 890 | 93 |
| Example 4 | 3.0 | — | — | — | Balance | 700 | 0.1 | 300 | 10 | Presence | 10 | 460 | 2000 | 1000 | 90 |
| Example 5 | 4.0 | — | — | — | Balance | 700 | 0.1 | 300 | 10 | Presence | 14 | 670 | 2000 | 1240 | 88 |
| Example 6 | 5.0 | — | — | — | Balance | 700 | 0.1 | 300 | 10 | Presence | 21 | 880 | 2000 | 2000 | 85 |
| Example 7 | 6.0 | — | — | — | Balance | 700 | 0.1 | 300 | 10 | Presence | 28 | 1030 | 2000 | 2000 | 82 |
| Example 8 | 4.0 | 0.5 | — | — | Balance | 700 | 0.1 | 300 | 10 | Presence | 17 | 670 | 2000 | 2000 | 87 |
| Example 9 | 4.0 | — | 0.5 | — | Balance | 700 | 0.1 | 300 | 10 | Presence | 18 | 690 | 2000 | 2000 | 84 |
| Example 10 | 4.0 | — | — | 0.5 | Balance | 700 | 0.1 | 300 | 10 | Presence | 17 | 700 | 2000 | 2000 | 84 |
| Example 11 | 4.0 | 0.5 | 0.5 | — | Balance | 700 | 0.1 | 300 | 10 | Presence | 19 | 700 | 2000 | 2000 | 83 |
| Example 12 | 4.0 | — | 0.5 | 0.5 | Balance | 700 | 0.1 | 300 | 10 | Presence | 19 | 710 | 2000 | 2000 | 81 |
| Example 13 | 4.0 | 0.5 | — | 0.5 | Balance | 700 | 0.1 | 300 | 10 | Presence | 18 | 690 | 2000 | 2000 | 82 |
| Example 14 | 4.0 | 0.5 | 0.5 | 0.5 | Balance | 700 | 0.1 | 300 | 10 | Presence | 19 | 690 | 2000 | 2000 | 80 |
| Example 15 | 4.0 | — | — | — | Balance | 700 | 0.1 | 350 | 2 | Presence | 14 | 370 | 2000 | 2000 | 84 |
| Example 16 | 4.0 | — | — | — | Balance | 700 | 0.1 | 350 | 4 | Presence | 14 | 440 | 2000 | 2000 | 86 |
| Example 17 | 4.0 | — | — | — | Balance | 700 | 0.1 | 350 | 5 | Presence | 12 | 460 | 2000 | 1680 | 87 |
| Example 18 | 4.0 | — | — | — | Balance | 700 | 0.1 | 370 | 10 | Presence | 12 | 1010 | 2000 | 2000 | 83 |
| Example 19 | 4.0 | — | — | — | Balance | 700 | 0.1 | 300 | 5 | Presence | 21 | 340 | 2000 | 2000 | 85 |
| Example 20 | 4.0 | — | — | — | Balance | 700 | 0.1 | 350 | 10 | Presence | 15 | 750 | 2000 | 1930 | 87 |
| Example 21 | 4.0 | — | — | — | Balance | 500 | 0.1 | 300 | 10 | Presence | 18 | 660 | 2000 | 2000 | 88 |
| Example 22 | 4.0 | — | — | — | Balance | 1000 | 0.1 | 300 | 10 | Presence | 18 | 650 | 2000 | 2000 | 88 |
| Example 23 | 4.0 | — | — | — | Balance | 700 | 0.04 | 350 | 5 | Presence | 33 | 1230 | 2000 | 2000 | 87 |
| Example 24 | 4.0 | — | — | — | Balance | 700 | 0.2 | 350 | 5 | Presence | 6 | 180 | 1120 | 540 | 87 |
| Example 25 | 4.0 | — | — | — | Balance | 700 | 0.3 | 350 | 5 | Presence | 5 | 120 | 1040 | 500 | 87 |
| Comparative Example 1 | 8.0 | — | — | — | Balance | 600 | 0.1 | 300 | 10 | Presence | 5 | 600 | 940 | 380 | 74 |
| Comparative Example 2 | 4.0 | 0.5 | — | — | Balance | 12 | 0.1 | 300 | 10 | Absence | — | — | 550 | 240 | 88 |
| Comparative Example 3 | 4.0 | — | — | — | Balance | 600 | 0.1 | 500 | 10 | Absence | — | — | 430 | 210 | 85 |
| Comparative Example 4 | 4.0 | 0.5 | — | — | Balance | 600 | 0.1 | 350 | 1800 | Absence | — | — | 670 | 340 | 86 |
| Comparative Example 5 | 4.0 | 0.05 | — | — | Balance | 600 | 0.08 | 600 | 1800 | Absence | — | — | 60 | 50 | 85 |
| Comparative Example 6 | 5.0 | — | — | — | Balance | 12 | 0.04 | — | — | Absence | — | — | 2000 | 2000 | 66 |

As indicated in Table 1, in the examples, the copper alloy wire rod was manufactured under the conditions of Example 1 to Example 14 in which the component composition is changed. The manufacturing condition in Example 1 to Example 14 was the same condition, the cooling rate was 700° C./s, and the heat treatment temperature was 300° C. and the retention time was 10 s. In addition, in the examples, the copper alloy wire rod was manufactured under the conditions of Example 15 to Example 25 in which the manufacturing condition is changed. In Example 15 to Example 25, the component composition was the same as Example 5, and at least one condition of the cooling rate, the heat treatment temperature, and the retention time was made to be a condition different from Example 5 within the range of the above-described embodiment.

In Example 1 to Example 25, as the casting step, first, oxygen-free copper and silver, and magnesium, chromium, and zirconium as needed, which are the raw materials, were put into a graphite crucible to be the component composition indicated in Table 1. Next, the raw materials were melted by performing heating such that the furnace temperature in the crucible is 1250° C. or more (1500° C. or more when using chromium). For oxygen-free copper, silver, magnesium, chromium, and zirconium as the raw materials, Cu, Ag, Mg, Cr, and Zr having purity of 99.9 wt % or more were used. A resistance-heating type heat method was used for the melting of the raw materials. The atmosphere in the crucible was a nitrogen atmosphere so as to avoid incorporation of oxygen into the molten metal. Furthermore, the molten metal housed in the crucible was held at 1250° C. or more for three hours or more, and then, was casted into an ingot having a size of a diameter of about 10 mm by a graphite mold. During the casting, the cooling rate was changed to be the cooling rate indicated in Table 1 by adjusting the water temperature and the water quantity of a water-cooling device. In addition, in Example 1 to Example 25, the ingot under a different condition was continuously casted by appropriately putting the molten metal into the mold depending on the condition indicated in Table 1 and adjusting the cooling rate depending on the condition indicated in Table 1.

After the casting step, as the wire drawing step, a wire rod having a wire diameter of 0.04 mm to 0.3 mm was manufactured by wire-drawing processing the ingot manufactured in the casting step at a one-pass processing rate of 10% or more and 25% or less.

After the wire drawing step, as the heat treating step, a copper alloy wire rod manufactured under each of the conditions of Example 1 to Example 25 was obtained by performing final heat treatment for the wire-drawing processed wire rod at the heat treatment temperature and the retention time indicated in Table 1. It is to be noted that, in the heat treating step, the heat treatment was performed by inter-running heat treatment under a nitrogen atmosphere.

In addition, in Comparative Examples 1 to 4, as the casting step, raw materials to be the component composition of Table 1 were put into a crucible and were melted by heating in the same manner as Example 1 to Example 25. Then, an ingot was manufactured by the continuous casting in the same manner as Example 1 to Example 25. It is to be noted that, in Comparative Example 1, the content of Ag was 8 wt % that does not satisfy the range of the above-described embodiment. In addition, in Comparative Example 2, the cooling rate during the continuous casting was a cooling rate of 12° C./s that does not satisfy the range of the above-described embodiment.

After the casting step, a wire rod having a wire diameter of 0.1 mm was manufactured from the ingot by performing the wire drawing step in the same manner as Example 1 to Example 25.

After the wire drawing step, as the heat treating step, a copper alloy wire rod was manufactured by performing final heat treatment for the wire-drawing processed wire rod under the condition of the heat treatment temperature and the retention time indicated in Table 1 in the same manner as Example 1 to Example 25. It is to be noted that, in Comparative Example 3, the heat treatment temperature was 500° C. that does not satisfy the above-described embodiment. In addition, in Comparative Example 4, the retention time was 1800 s that does not satisfy the range of the above-described embodiment.

Furthermore, in Comparative Example 5, as the casting step, first, the surfaces of copper, silver, and magnesium as the raw materials were acid-washed with 20 vol % nitric acid and were sufficiently dried. For copper, silver, and magnesium as the raw materials, Cu, Ag, and Mg having purity of 99.99 wt % or more were used. Next, the acid-washed raw materials were put into a graphite crucible to be the component composition indicated in Table 1. Furthermore, the raw materials were melted by performing heating such that the furnace temperature in the crucible is 1200° C. or more with the inside of the crucible being a nitrogen atmosphere. A resistance-heating type heat method was used for the melting of the raw materials. Then, the molten metal was sufficiently stirred and was held under the temperature condition of 1200° C. or more for 60 minutes. Next, the molten metal was injected into a graphite mold from the bottom of the crucible, and an ingot having a diameter of 20 mm was manufactured by performing continuous casting in a lateral direction. It is to be noted that, in Comparative Example 5, the cooling rate during the casting was 600° C./s.

After the casting step, as the wire drawing step, a wire rod having a wire diameter of 0.08 mm was manufactured by wire-drawing processing, and then, scalping processing the ingot manufactured in the casting step.

After the wire drawing step, as the heat treating step, a copper alloy wire rod was manufactured by performing heat treatment of the heat treatment temperature of 600° C. and the retention time of 1800 s for the wire rod under a nitrogen atmosphere. It is to be noted that, in the heat treating step, the heat treatment was performed by inter-running heat treatment under a nitrogen atmosphere.

Furthermore, in Comparative Example 6, as the casting step, raw materials to be the component composition of Table 1 were put into a crucible and were melted by heating in the same manner as Example 1 to Example 25. Then, an ingot having a diameter of 8 mm was manufactured by the continuous casting in the same manner as Example 1 to Example 25.

After the casting step, a wire rod having a wire diameter of 2.6 mm was manufactured from the ingot by performing the wire-drawing processing in the same manner as the wire drawing step of Example 1 to Example 25.

Then, heat treatment was performed for the wire-drawing processed wire rod under the condition of the heat treatment temperature of 450° C. and the retention time of five hours under a nitrogen atmosphere.

Furthermore, in Comparative Example 6, after the heat treating step, a copper alloy wire rod was manufactured by furnace-cooling (cooling in the furnace) the wire rod for which the heat treatment was performed, and performing the wire-drawing processing again until the wire diameter becomes 0.04 mm. As described above, in Comparative Example 6, unlike in Example 1 to Example 25 and Comparative Example 1 to Comparative Example 5, the copper alloy wire rod is manufactured by performing the heat treatment after performing the wire-drawing processing, and further performing the wire-drawing processing. The copper alloy wire rod manufactured in this manner in Comparative Example 6 corresponds to Specimen No. 2 to 5 described in PTL 1. It is to be noted that, the heat treatment in Comparative Example 6 is different from the heat treating step performed as the final step of the manufacturing process in Example 1 to Example 25 and Comparative Example 1 to Comparative Example 5, and thus, a condition of the heat treatment is not described in Table 1.

In addition, in the examples, a structure observation of a cross section was conducted, and evaluation of second phase particles was conducted by a method described below. In the structure observation, first, for the copper alloy wire rod manufactured under the conditions of Example 1 to Example 25 and Comparative Example 1 to Comparative Example 6, a cross section parallel to the longitudinal direction was cut out. The cross section was carefully cut out so as to pass through the center of the wire rod as much as possible at this time, but the cross section is difficult to be cut out so as to accurately pass through the center of the copper alloy wire rod. Therefore, in the examples, a cross section in which a width perpendicular to the longitudinal direction of the copper alloy wire rod is 90% or more of the wire diameter of the wire rod was regarded as the cross section passing through the center of the wire rod. Next, the cut-out cross section was mirror-finished by wet polishing and buff polishing. Furthermore, for the polished cross section, a structure photograph of a rectangular region of 1.7 μm×2.3 μm was taken at 50000-fold magnification using a scanning electron microscope (FE-SEM, manufactured by JEOL Ltd.)

Figure 3:
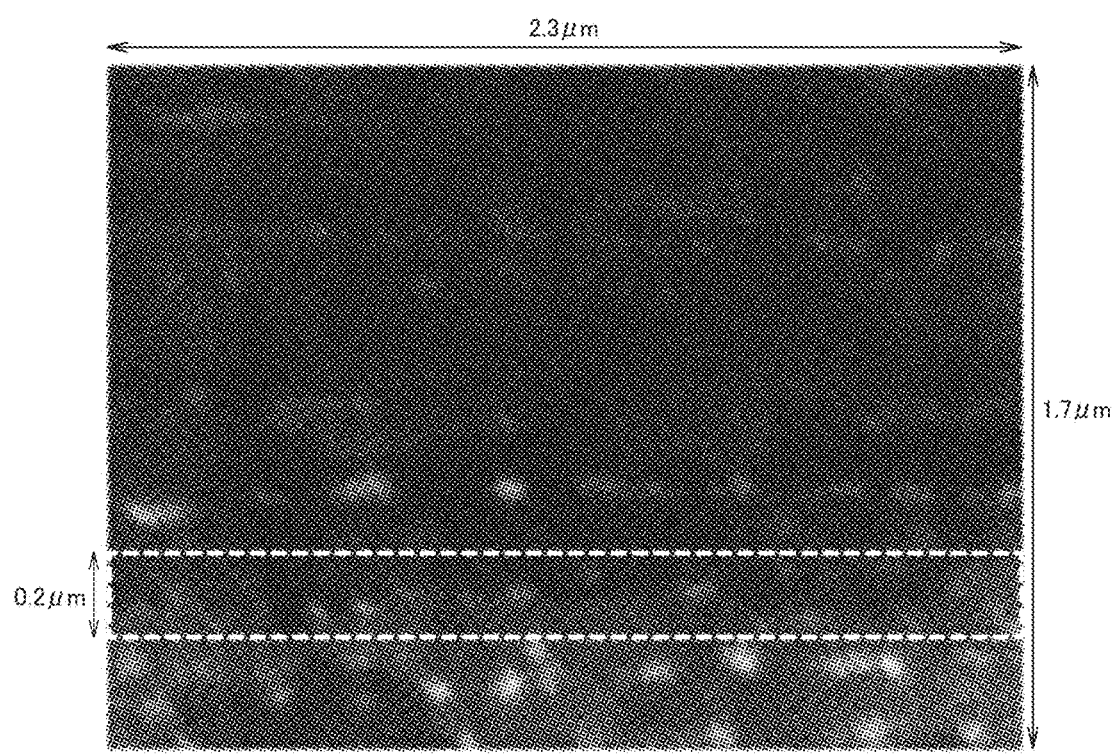
FIG. 3 is a structure photograph illustrating the cross section of the copper alloy wire rod according to one embodiment of the present invention.
Figure 4:
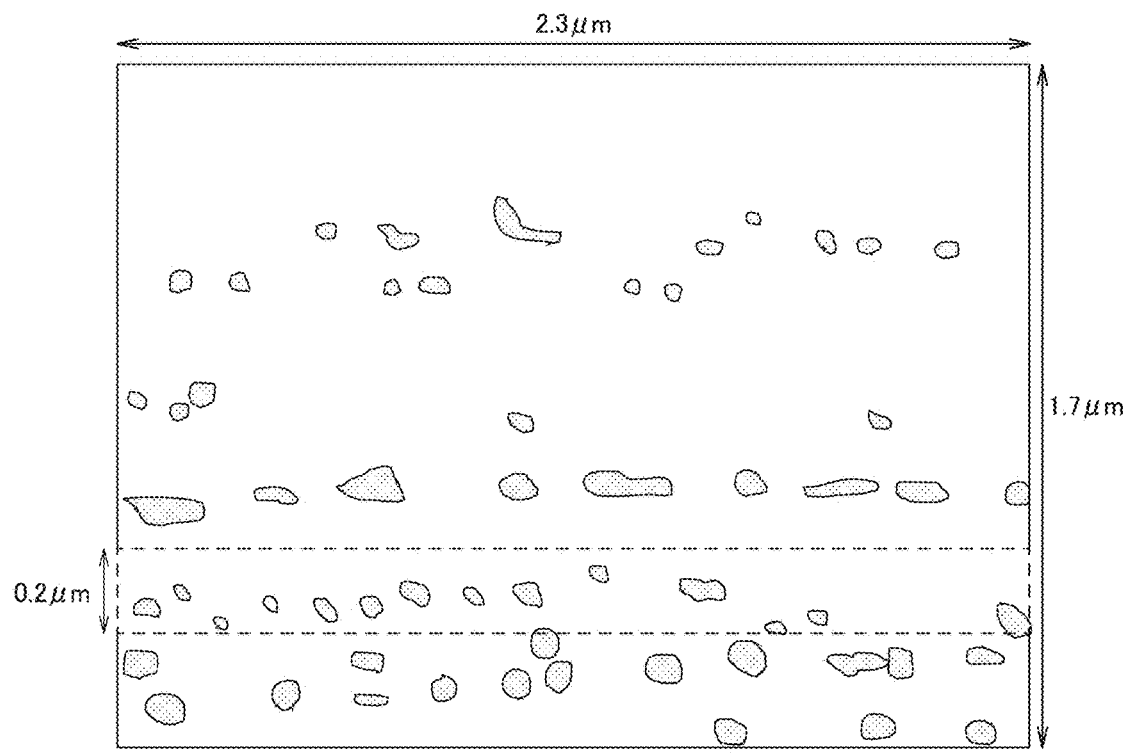
FIG. 4 is a schematic diagram divided into a second phase and a mother phase from a white contrast difference of FIG. 3.

FIG. 3 illustrates an example of the actually taken structure photograph of the cross section of the copper alloy wire rod according to the above-described embodiment. In FIG. 3, particulate objects of the white contrast indicate the second phase. In addition, FIG. 4 illustrates a schematic diagram divided into the second phase and the mother phase from a contrast difference in the photograph of FIG. 3. As can be seen from FIG. 4, it can be confirmed that, in the copper alloy wire rod according to the above-described embodiment, the second phase particles are linearly formed along the longitudinal direction (horizontal direction in FIG. 4). Moreover, it can be confirmed that a rectangular range indicated by the dotted line, which entirely includes five or more second phase particles, exists in the cross section of FIG. 4. As the results of the structure observation, Table 1 indicates the average number of the second phase particles included in the rectangular range of each of the conditions of Example 1 to Example 25 and Comparative Example 1 to Comparative Example 6. When multiple applicable rectangular ranges exist in the visual field of 1.7 μm×2.3 μm, the numbers of the second phase particles in the respective rectangular ranges were counted and summed up, and the sum was divided by the number of the rectangular ranges, so that the average number was obtained. It is to be noted that the rectangular ranges were selected such that the rectangular ranges do not overlap with each other.

In addition, in the rectangular range that satisfies the above-described condition of the second phase particles, the maximum lengths in the longitudinal direction of the copper alloy wire rod of the counted second phase particles were respectively measured, and the total length obtained by summing up the maximum lengths of the respective second phase particles was calculated. It is to be noted that, as the results of the structure observation, Table 1 indicates the total length of the second phase particles included in the rectangular range of each of the conditions of Example 1 to Example 25 and Comparative Example 1 to Comparative Example 6. It is to be noted that, when multiple applicable rectangular ranges exist in the visual field of 1.7 μm×2.3 μm, the longest one among the total lengths of the second phase particles included in the rectangular ranges was selected and listed.

Furthermore, in the examples, as the characteristic evaluation of the copper alloy wire rod, vibration durability, heat resistance, and electric conductivity were evaluated.

Figure 5:
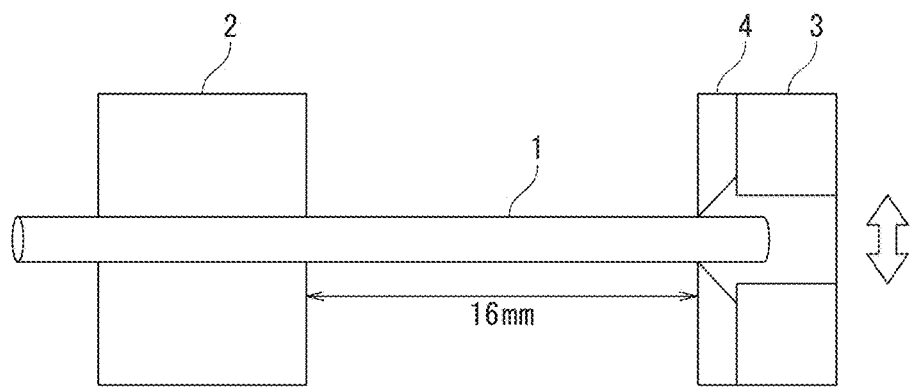
FIG. 5 is a schematic diagram illustrating a high-cycle fatigue tester used in a vibration test.

In the evaluation of the vibration durability, a vibration test was conducted at 20° C. using a high-cycle fatigue tester illustrated in FIG. 5. In the vibration test, first, both end parts in the longitudinal direction of a copper alloy wire rod 1 obtained by cutting the copper alloy wire rod into a length of 80 mm were respectively held by a pressing jig 2 and a knife-edge 4 attached to an edge stand 3 to be fixed. Copper plates having a thickness equivalent to the wire diameter of the wire rod were inserted on both sides of the wire rod such that the wire rod is not crushed by the pressing jig 2 or the knife-edge 4. The distance of the copper alloy wire rod 1 between the fixed position by the pressing jig 2 and the fixed position by the knife-edge 4 was 16 mm. Next, with the copper alloy wire rod 1 being fixed, the edge stand 3 was reciprocated 50 times per second with an amplitude of 1.6 mm in a vertical direction parallel to a direction in which the copper alloy wire rod 1 is held by the knife-edge 4, so that the copper alloy wire rod 1 was vibrated. In the examples, the vibration test was conducted six times for each of the conditions of Example 1 to Example 25 and Comparative Example 1 to Comparative Example 6, and the average thereof was calculated. As the number of times of vibration durability in this case, 10 million times or more was regarded as acceptance. When withstanding 20 million times of vibration, the test was terminated, and 20 million times was listed in Table 1.

In addition, in the evaluation of the heat resistance, a vibration test similar to that of the vibration durability was conducted in a constant-temperature bath at 80° C. six times for each of the conditions of Example 1 to Example 25 and Comparative Example 1 to Comparative Example 6. As the number of times of vibration durability in this case, five million times or more was regarded as acceptance. In addition, when withstanding 20 million times of vibration, the test was terminated, and 20 million times was listed in Table 1.

Figure 6:
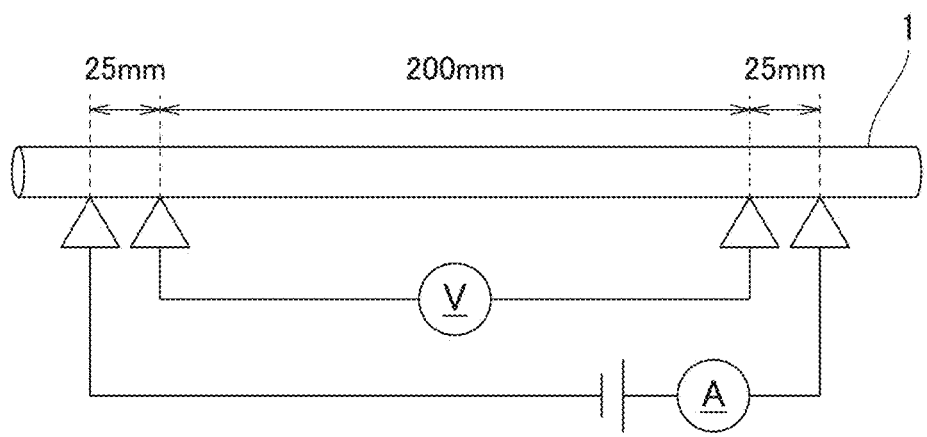
FIG. 6 is a schematic diagram illustrating an electric conductivity measuring device used for measuring electric conductivity.

Furthermore, in the evaluation of the electric conductivity, a measurement of the electric conductivity was made using an electric conductivity measuring device by a four-terminal method illustrated in FIG. 6 for each of the conditions of Example 1 to Example 25 and Comparative Example 1 to Comparative Example 6. In the measurement, average electric conductivity was calculated by measuring specific resistance of the copper alloy wire rod 1 having a length of 300 mm three times. It is to be noted that the distance between voltage terminals was 200 mm, and the distance between a voltage terminal and a current terminal was 25 mm. The higher electric conductivity in the copper alloy wire rod is preferable, and 80% IACS or more was regarded as acceptance.

As indicated in Table 1, it was confirmed that, in the evaluation of the vibration durability, the heat resistance, and the electric conductivity, all were acceptance under the conditions of Example 1 to Example 25.

Furthermore, as can be seen from the structure evaluation of Example 1 to Example 7, it was confirmed that, as the content of Ag is increased, the number of the rectangular ranges and the number of the second phase particles are increased, the total length of the second phase particles becomes longer, and the vibration durability is improved.

Furthermore, it was confirmed from the results of the structure evaluation that, in Example 8 to Example 14 in which one or two or more elements selected from the group consisting of Mg, Cr, and Zr, are added, the vibration durability is improved compared to Example 5 in which the content of Ag and the manufacturing condition are the same.

In contrast, in Comparative Example 1 in which the content of Ag is more than 6 wt % and the manufacturing condition satisfies the conditions of the above-described embodiment, it was confirmed that the rectangular range entirely including five or more second phase particles exists and the vibration durability is improved, but it was confirmed that the electric conductivity is decreased to less than 80% IACS.

In addition, in Comparative Example 2 to Comparative Example 6 in which the component composition satisfies the conditions of the above-described embodiment and at least one of the cooling rate, the heat treatment temperature, and the retention time as the manufacturing condition does not satisfy the conditions of the above-described embodiment, the electric conductivity was 80% IACS, but the rectangular range entirely including five or more second phase particles could not be confirmed. Therefore, it was confirmed that the vibration durability and the heat resistance are decreased, and a copper alloy wire rod having desired characteristics cannot be obtained under the conditions of Comparative Example 2 to Comparative Example 6.

REFERENCE SIGNS LIST 1 copper alloy wire rod
2 pressing jig
3 edge stand
4 knife-edge

The invention claimed is:

1. A copper alloy wire rod comprising:
Ag: 0.5 wt % or more and 6 wt % or less and the balance including inevitable impurities and Cu, wherein,
on a cross section parallel to a longitudinal direction of the copper alloy wire rod, within a range observed with a visual field of 1.7 μm in a direction perpendicular to the longitudinal direction and 2.3 μm in a direction parallel to the longitudinal direction, the copper alloy wire rod has at least one rectangular range that is a rectangular range having a width perpendicular to the longitudinal direction of 0.2 μm and a length parallel to the longitudinal direction of 2.3 μm and entirely includes five or more second phase particles containing Ag and having a maximum length in the longitudinal direction of less than 300 nm.

2. The copper alloy wire rod according to claim 1, wherein
the sum of the maximum lengths in the longitudinal direction of the five or more second phase particles entirely included in the rectangular range is 300 nm or more.

3. The copper alloy wire rod according to claim 1, further comprising:
one or two or more elements selected from the group consisting of Mg: more than 0 wt and 1 wt % or less, Cr: more than 0 wt and 1 wt % or less, and Zr: more than 0 wt and 1 wt % or less.

4. The copper alloy wire rod according to claim 1, wherein
the number of times of vibration durability in a vibration test conducted under a test environment of 80° C. is 10 million times or more.

5. The copper alloy wire rod according to claim 1, wherein
a wire diameter of the wire rod is 0.01 mm or more and 0.32 mm or less.

6. A method for manufacturing a copper alloy wire rod comprising:
a casting step of manufacturing an ingot of copper alloy by casting molten metal containing Ag: 0.5 wt % or more and 6 wt % or less and the balance including inevitable impurities and Cu at a cooling rate of 500° C./s or more;
a wire drawing step of manufacturing a wire rod by wire-drawing processing the ingot; and
a heat treating step of heat treating the wire rod at a heat treatment temperature of 300° C. or more and 370° C. or less and retention time of 10 seconds or less.

7. The copper alloy wire rod according to claim 2, wherein
the number of times of vibration durability in a vibration test conducted under a test environment of 80° C. is 10 million times or more.

8. The copper alloy wire rod according to claim 3, wherein
the number of times of vibration durability in a vibration test conducted under a test environment of 80° C. is 10 million times or more.

9. The copper alloy wire rod according to claim 2, wherein
a wire diameter of the wire rod is 0.01 mm or more and 0.32 mm or less.

10. The copper alloy wire rod according to claim 3, wherein
a wire diameter of the wire rod is 0.01 mm or more and 0.32 mm or less.

11. The copper alloy wire rod according to claim 4, wherein
a wire diameter of the wire rod is 0.01 mm or more and 0.32 mm or less.

12. The copper alloy wire rod according to claim 2, further comprising:
one or two or more elements selected from the group consisting of Mg: more than 0 wt and 1 wt % or less, Cr: more than 0 wt and 1 wt % or less, and Zr: more than 0 wt and 1 wt % or less.

* * * * *